United States Patent
Yim et al.

(10) Patent No.: US 11,601,033 B2
(45) Date of Patent: Mar. 7, 2023

(54) GROUND STRUCTURE OF DRIVING MOTOR

(71) Applicants: HYUNDAI MOTOR COMPANY, Seoul (KR); KIA MOTORS CORPORATION, Seoul (KR)

(72) Inventors: Jeong Bin Yim, Incheon (KR); Jin Ho Kim, Incheon (KR); Sang Hoon Moon, Yongin-si (KR); Jung Shik Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 164 days.

(21) Appl. No.: 17/113,587

(22) Filed: Dec. 7, 2020

(65) Prior Publication Data
US 2021/0351671 A1    Nov. 11, 2021

(30) Foreign Application Priority Data

May 7, 2020  (KR) ........................ 10-2020-0054184

(51) Int. Cl.
*H02K 11/40*    (2016.01)
*H02K 5/16*    (2006.01)
*H02K 5/173*    (2006.01)

(52) U.S. Cl.
CPC ............. *H02K 11/40* (2016.01); *H02K 5/161* (2013.01); *H02K 5/1732* (2013.01)

(58) Field of Classification Search
CPC ....... H02K 11/40; H02K 5/161; H02K 5/1732
USPC ............................................................ 310/89
See application file for complete search history.

(56) References Cited

FOREIGN PATENT DOCUMENTS

CN    107404198    * 11/2017    ............. H02K 11/40

OTHER PUBLICATIONS

Machine translation of CN107404198, Hu et al., Nov. 2017 (Year: 2017).*

* cited by examiner

*Primary Examiner* — Terrance L Kenerly
(74) *Attorney, Agent, or Firm* — Lempia Summerfield Katz LLC

(57) ABSTRACT

A ground structure of a driving motor applied to an eco-friendly vehicle includes a rotation shaft rotatably supported by a bearing, a motor housing enveloping the bearing and the rotation shaft, a ground structure disposed in a direction in which the rotation shaft extends, and a cover having the ground structure installed therein and connected to the motor housing. In particular, the ground structure contacts the rotation shaft through a ground unit, thereby grounding the rotation shaft.

11 Claims, 5 Drawing Sheets

GROUND STRUCTURE OF DRIVING MOTOR

CROSS REFERENCE TO RELATED APPLICATION

The present application claims priority to and the benefit of Korean Patent Application No. 10-2020-0054184, filed May 7, 2020, the entire contents of which are incorporated herein by reference.

FIELD

The present disclosure relates to a ground structure of a driving motor for grounding a rotation shaft of the driving motor.

BACKGROUND

The statements in this section merely provide background information related to the present disclosure and may not constitute prior art.

Recently, a pure electric power eco-friendly vehicle such as an electric vehicle, fuel cell vehicle, or the like has attracted attention. Such an electric power eco-friendly vehicle is equipped with an electric motor (hereinafter referred to as a driving motor) as a driving source for obtaining rotational power from electric energy instead of an internal combustion engine and the like.

The driving motor used as a power source for the eco-friendly vehicle includes a housing, a stator fixedly installed inside the housing, and a rotor disposed at a predetermined gap with the stator and rotating around a rotation shaft as a drive shaft. The driving motor used in the eco-friendly vehicle is supplied with three-phase AC power through an inverter. The inverter converts DC power of a battery into three-phase AC through power module switching. At this time, three-phase voltage is not a complete sinusoidal waveform and the sum of the three-phase voltage is not zero. This is called common-mode voltage. Due to the common-mode voltage applied to the coil of the driving motor, axial voltage is generated in the rotation shaft due to the parasitic capacitance inside the driving motor. The axial voltage causes a potential difference between the inner and outer rings of the bearing that supports the rotation shaft and causes electric erosion of the bearing by the discharge mechanism inside the bearing. Such electric erosion has a serious influence on durability of the driving motor, for example, the electric erosion may cause damage to the bearing and the like.

In the conventional art, in order to reduce the axial voltage caused at the rotation shaft of the driving motor, a ground ring (shaft ground ring) that applies an electric current to both the housing and the rotation shaft is installed between the rotation shaft and the housing. However, the ground ring is to electrically provide a ground connection of the rotation shaft that is being rotated and the housing that is fixed. Therefore, friction is generated between the ground ring and the rotation shaft, and the durability of the ground ring is deteriorated due to the generated friction. In addition, a brush applied to the ground ring has a disadvantage in that the brush is low in oil resistance and thus is vulnerable to damage due to automatic transmission fluid (ATF) oil. In addition, there is a disadvantage that the ground ring is expensive.

The foregoing is intended merely to aid in the understanding of the background of the present disclosure, and is not intended to mean that the present disclosure falls within the purview of the related art that is already known to those skilled in the art.

SUMMARY

The present disclosure provides a ground structure of a driving motor for realizing application of an electric current between a rotation shaft and a motor housing while reducing or minimizing friction with the rotation shaft.

In addition, the present disclosure provides a ground structure of a driving motor, which is configured to prevent damage to the ground structure due to rotation of the rotation shaft.

In one form of the present disclosure, a ground structure of a driving motor applied to an eco-friendly vehicle includes: a rotation shaft rotatably supported by a bearing; a motor housing enveloping the bearing and the rotation shaft; a ground structure disposed in a direction in which the rotation shaft extends; and a cover having the ground structure installed therein and connected to the motor housing, wherein the ground structure contacts the rotation shaft through a ground unit, thereby grounding the rotation shaft.

By one form, the ground structure may include: a ground housing connected to the cover; the ground unit extending from an inside of the ground housing and contacting the rotation shaft; and a spring fixedly coupled inside the ground housing and electrically connected to the ground unit.

By one form, the ground structure may further includes a ground plate disposed between the ground unit and the spring, wherein the ground unit is configured to rotate according to a rotation of the rotation shaft, and the ground plate contacts the ground unit and plays a role of preventing the spring from being damaged due to rotation of the ground unit.

By one form, the ground plate may reduce rotational force transmitted to the spring due to slip of a rotation body of the ground unit.

By one form, the ground unit may include: an extension portion extending toward the rotation shaft in the ground housing so as to contact the rotation shaft; and a support portion that prevents the ground unit from departing outward from the ground housing and contacts the ground plate.

By one form, the ground housing may have an opening in which one end of the ground housing is open in a direction toward the rotation shaft, and the support portion may have a sectional area larger than an open area of the opening to prevent the ground unit from departing outward from the ground housing.

By one form, the support portion may be divided into a first region adjacent to the extension portion and a second region adjacent to the ground plate, wherein the second region may be configured to be a shape in which a sectional area thereof decreases in a direction toward the ground plate.

By one form, the ground housing may have an opening in which one end of the ground housing is open in a direction toward the rotation shaft, and the ground unit may be configured as a ball having a diameter larger than a diameter of an open area of the opening.

By one form, the ground structure may include: a ground housing connected to the cover; the ground unit contacting the rotation shaft and extending into the ground housing; a ground plate electrically connected to the ground unit; and a spring fixedly coupled inside the ground housing and connected to the ground plate, wherein the ground unit may include a ground cover covering an end of the rotation shaft and an extension portion extending from the ground cover toward the ground housing.

By one form, the ground structure may further include an additional ground plate provided between the ground unit and the ground plate to prevent the spring from being damaged due to rotation of the rotation shaft.

By one form, a sectional area of the ground unit may be smaller than a sectional area of the rotation shaft.

By one form, the ground structure may be disposed to penetrate through the cover, the ground unit may be disposed inside the motor housing, and one end of the ground structure disposed in a direction opposite to the ground unit may be disposed outside the motor housing.

By one form, the ground unit may contact a center of the rotation shaft.

According to the form of the present disclosure, since the ground unit having a much smaller sectional area than the rotation shaft is used, the area where the ground unit and the rotation shaft cause friction can be reduced or minimized. Accordingly, when the friction between the rotation shaft and the ground unit is reduced, durability of the ground structure including the ground unit can be improved.

According to the form of the present disclosure, the ground unit and the rotation shaft can be prevented from being damaged by the spring and the ground plate constituting the ground structure.

According to one form of the present disclosure, as the extension portion of the ground structure contacts the center of the rotation shaft, the area where the ground structure and the rotation shaft contact each other can be reduced or minimized. Accordingly, the durability of the ground structure can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
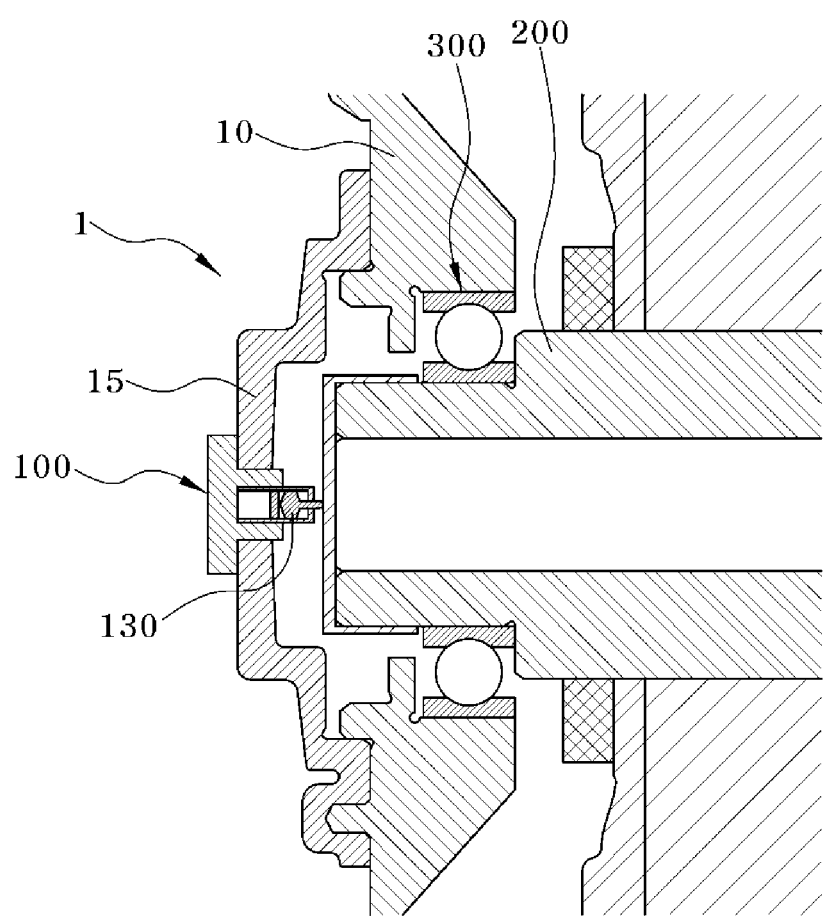
FIG. 1 is a view showing a driving motor according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Advantages and features of the present disclosure and methods of achieving same will be clarified with reference to exemplary forms described below in detail together with the accompanying drawings. However, the present disclosure is not limited to the forms disclosed below but may be implemented in various forms different from each other. The present forms are provided only to make the disclosure of the present disclosure complete and to fully inform the scope of the disclosure to those of ordinary skill in the art to which the present disclosure pertains. Here, the present disclosure is only defined by the scope of the claims. In addition, the same reference numerals throughout the specification refer to the same components.

Terms such as " . . . division", " . . . unit", " . . . module", and the like in the specification mean a unit that processes at least one function or operation, which may be implemented by hardware, software, or a combination of hardware and software.

In addition, in the present specification, names of the components are classified as first, second, and the like to distinguish the components when the components have the same names, but the names are not necessarily limited to that order in the following description.

The detailed description is intended to illustrate the present disclosure. In addition, the above-stated description is to describe exemplary forms of the present disclosure, and the present disclosure may be used in various other combinations, modifications, and environments. That is, changes or modifications are possible within the scope of the concept of the disclosure disclosed herein, the scope equivalent to the disclosed disclosure, and/or the scope of the art or knowledge in the art. The described forms describe the best state for implementing the technical spirit of the present disclosure and may be applied to various changes, required in specific application fields and uses, of the present disclosure.

Therefore, the above detailed description of the disclosure is not intended to limit the present disclosure to the disclosed states of implementation. In addition, the appended claims should be construed to include other states of implementation.

FIG. 1 is a view showing a driving motor according to one form of the present disclosure.

With reference to FIG. 1, a driving motor 1 may include a stator (not shown) that is fixedly installed inside a motor housing 10 and generates magnetic flux, and a rotor (not shown) that is disposed at a predetermined gap with the stator and rotates around the rotation shaft 200 as a drive shaft. For example, the driving motor 1 may be applied to a synchronous motor of an inner rotor type in which a rotor (not shown) is arranged on an inner side of a stator (not shown).

A cover 15 for sealing the housing 10 may be installed on one side of the housing 10. Further, the cover 15 may be connected to the housing 10. The rotation shaft 200 may be rotatably supported by a bearing 300 disposed on one side of the housing 10.

The cover 15 may be provided with a ground structure 100 for applying an electric current between the rotation shaft 200 and the housing 10. The ground structure 100 may be made of a conductive material. The ground structure 100 may be disposed to penetrate through the cover 15. The ground structure 100 may move charge, which causes axial voltage generated in the rotation shaft 200, to the housing 10 by being directly contacted with the rotation shaft 200. That is, the ground structure 100 may contact the rotation shaft 200 through a ground unit 130 that is one component of the ground structure 100, thereby allowing the rotation shaft 200 to be grounded. The ground unit 130 may be disposed inside the housing 10, and one end of the ground structure 100 disposed in a direction opposite to the ground unit 130 may be disposed outside the housing 10.

A sectional area of the ground unit 130 may be smaller than a sectional area of the rotation shaft 200. In addition, the ground unit 130 may be disposed at a position corresponding to a rotation axis of the rotation shaft 200 to contact the center of the rotation shaft 200. Through this, the area where the ground unit 130 and the rotation shaft 200 contact each other may be reduced or minimized.

In general, a ground ring applied to the driving motor 1 comes into contact with the outer surface of the rotation shaft 200. Accordingly, the ground ring and the rotation shaft 200 cause friction in an area equal to a value obtained by multiplying a circumferential length taking the rotation axis of the rotation shaft 200 as a reference, and a width of the ground ring in a direction of the rotation axis. However, according to one form of the present disclosure, the ground unit 130 is configured to have a much smaller sectional area than the rotation shaft 200, and thus the ground unit 130 and the rotation shaft 200 may cause friction only in an area corresponding to the sectional area of the ground unit 130. In conclusion, when the friction between the rotation shaft 200 and the ground unit 130 is reduced, the durability of the ground structure 100 including the ground unit 130 may be improved.

Figure 2:
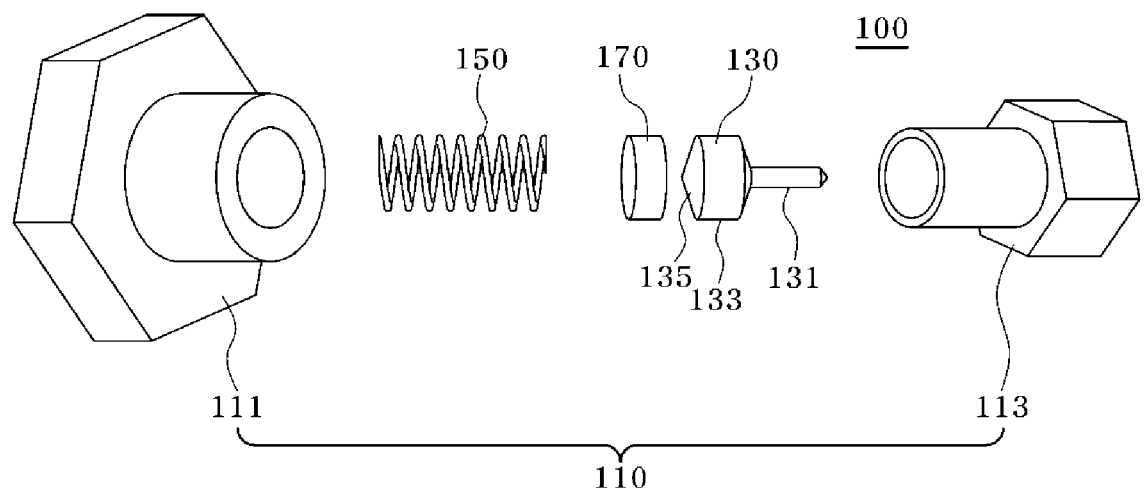
FIG. 2 is an exploded perspective view showing a ground structure of a driving motor according to one form of the present disclosure.
Figure 3:
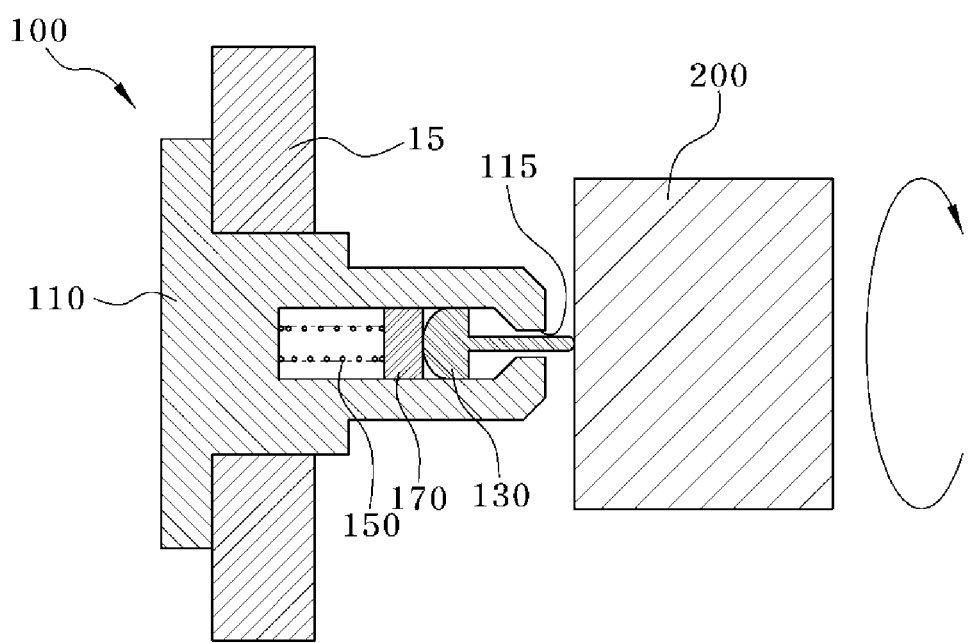
FIG. 3 is a view illustrating a ground structure of a driving motor grounding a rotation shaft in one form of the present disclosure.

FIG. 2 is an exploded perspective view showing a ground structure of a driving motor according to one form of the present disclosure, and FIG. 3 is a view illustrating a ground structure of a driving motor according to one form of the present disclosure grounding a rotation shaft.

With reference to FIGS. 1 to 3, the ground structure 100 may include a ground housing 110, the ground unit 130, a spring 150, and a ground plate 170.

The ground housing 110 is configured to contact the cover 15 and may be divided into a first ground housing 111 and a second ground housing 113. A hollow defined for providing a ground unit 130, the spring 150, and the ground plate 170 may be provided in the first grounding housing 111 and the second grounding housing 113. The first ground housing 111 may be configured to directly contact the cover 15. The second grounding housing 113 may be inserted into the hollow of the first grounding housing 111. In the second ground housing 113, an opening 115 that is a passage through which the ground unit 130 extends outside the ground structure 100 may be defined. The opening 115 may mean an area in which one end of the second ground housing 113 is opened in a direction in which the second ground housing 113 faces the rotation shaft 200.

The ground unit 130 may be configured to extend from the inside of the ground housing 110 and contact the rotation shaft 200. The ground unit 130 may include an extension portion 131 extending toward the rotation shaft 200 from the inside of the grounding housing 110 so as to directly contact the rotation shaft 200, and a support portion 133 and 135 for preventing the ground unit 130 from departing outward from the grounding housing 110.

The extension portion 131 may have a pin shape extending toward the opening 115 defined in the second ground housing 113. The support portion 133 and 135 may be connected to the extension portion 131. The support portion 133 and 135 may be electrically connected to the ground plate 170. The support portion 133 and 135 may not always be configured to be physically connected to the ground plate 170. However, by the movement of the spring 150, the support portion 133 and 135 may contact the ground plate 170, and the support portion 133 and 135 may transfer the charge transferred from the extension portion 131 to the spring 150 and/or to the ground housing 110. The support portion 133 and 135 may have a sectional area larger than the open area of the opening 115. Since the sectional areas of the support portion 133 and 135 are larger than the open area of the opening 115, the ground unit 130 may be prevented from departing outward from the grounding housing 110. The open area may mean an area of a hole provided in the second ground housing 113 by the opening 115.

The support portion 133 and 135 may be divided into a first region 133 connected to the extension portion 131 and a second region 135 adjacent to the ground plate 170. The second region 135 may mean an area in contact with the ground plate 170. The first region 133 and the second region 135 may have sectional areas, different from each other, cut in a direction perpendicular to the rotation axis. The second region 135 may have a shape in which the sectional area thereof gradually decreases in a direction toward the ground plate 170. For example, the second region 135 may have a conical shape. Unlike the above-described example, the second region 135 may have the same sectional area as the first region 133, and the second region 135 may have a smaller sectional area than the first region 133.

The spring 150 is fixedly coupled inside the first ground housing 111 to be electrically connected to the ground unit 130 and the ground plate 170. In the present form, the spring 150 may be connected to the ground plate 170. The spring 150 may change a position of the ground unit 130 to prevent the ground unit 130 from being damaged due to friction with the rotation shaft 200. For example, as the spring 150 contracts, the ground unit 130 may not contact the rotation shaft 200. In addition, by the elasticity of the spring 150, the ground unit 130 and the rotation shaft 200 may not be in strong contact each other, so that the durability of the ground unit 130 and the rotation shaft 200 may be improved.

The ground plate 170 may be disposed between the ground unit 130 and the spring 150. The ground plate 170 is connected to the spring 150, but may not always be connected to the ground unit 130. However, when the ground plate 170 and the ground unit 130 are connected to each other, the rotation shaft 200 may be grounded. Although the ground plate 170 is not configured to be physically connected to the ground unit 130, the ground plate 170 and the ground unit 130 may always in contact each other. As being contacted with the rotation shaft 200, the ground unit 130 may rotate in the same direction as the rotation shaft 200. However, the ground unit 130 may be rotated at a lower rotational speed than the rotation shaft 200 due to a slip phenomenon generated between the ground unit 130 and the rotation shaft 200. In addition, slip may also occur between the ground plate 170 and the ground unit 130, and the ground plate 170 may be rotated at a lower rotational speed than the ground unit 130. Therefore, the ground plate 170 may transmit the rotational force of the rotation shaft 200 to the spring 150 to a minimum, so that the ground plate 170 may prevent the spring 150 from being damaged due to the rotation of the ground unit 130. That is, the ground plate 170 may reduce the rotational force transmitted to the spring 150 by the slip of a rotation body of the ground unit 130 and the slip of the ground plate 170 itself.

According to one form of the present disclosure, the durability of the ground structure 100 may be improved as the area where the ground structure 100 and the rotation shaft 200 contact each other is reduced or minimized. In addition, by the spring 150 and the ground plate 170 of the ground structure 100, the ground unit 130 and the rotation shaft 200 may be prevented from being damaged.

According to another form of the present disclosure, as the extension portion 131 of the ground structure 100 comes into contact with the center of the rotation shaft 200, the area where the ground structure 100 and the rotation shaft 200 contact each other may be reduced or minimized. Accordingly, durability of the ground structure 100 may be improved.

Figure 4:
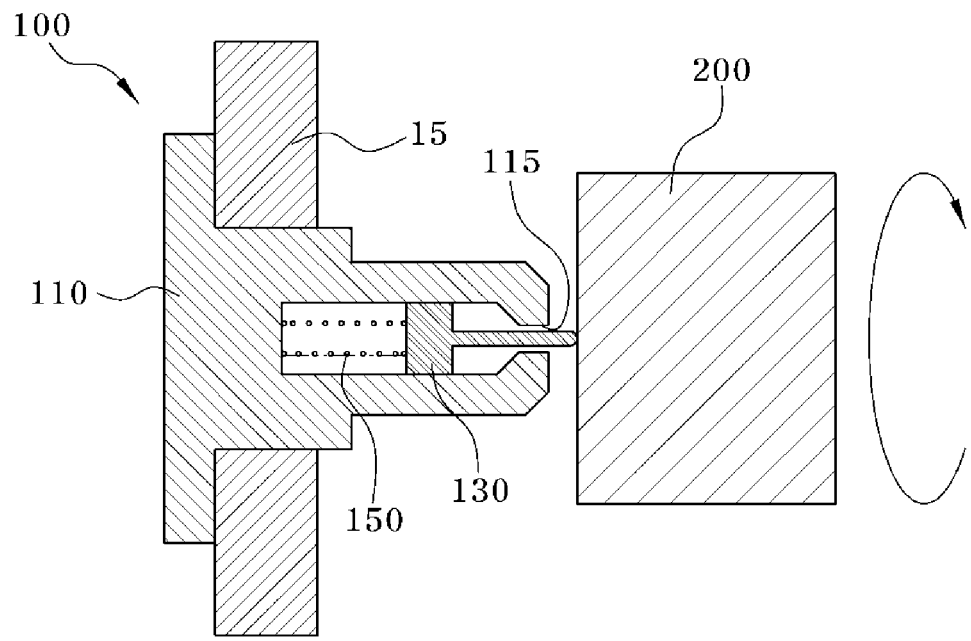
FIG. 4 is a view illustrating a ground structure of a driving motor grounding a rotation shaft in one form of the present disclosure.

FIG. 4 is a view illustrating a ground structure of a driving motor according to one form of the present disclosure grounding a rotation shaft. For the sake of simplicity, a description of contents overlapping with FIG. 3 is omitted.

With reference to FIG. 4, a ground structure 100 may include a ground unit 130 and a spring 150. Compared to FIG. 3, the ground structure 100 of FIG. 4 may have a structure in which the ground plate 170 is omitted. Accordingly, it is possible to manufacture the ground structure 100 with a simple structure, and thus the cost of producing the ground structure 100 may be reduced.

The ground unit 130 may be directly connected with the spring 150. Accordingly, the rotational force of the rotation shaft 200 may be relatively largely transmitted to the spring 150.

Figure 5:
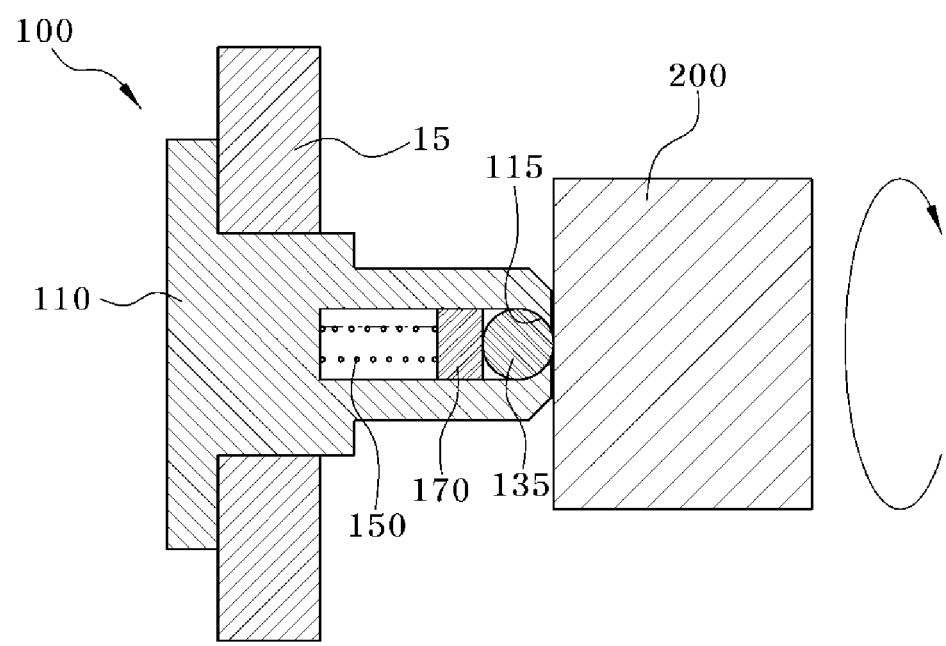
FIG. 5 is a view illustrating a ground structure of a driving motor grounding a rotation shaft in one form of the present disclosure.

FIG. 5 is a view illustrating a ground structure of a driving motor according to one form of the present disclosure grounding a rotation shaft. For the sake of simplicity, a description of contents overlapping with FIG. 3 is omitted.

With reference to FIG. 5, a ground structure 100 may have a ball-shaped ground unit 135. A portion of the ground unit 135 may be exposed by an opening 115, and a portion of the exposed ground unit 135 may contact a rotation shaft 200. At this time, the ground unit 135 may contact the center of the rotation shaft 200. For example, the opening 115 may have a circular open area, and a diameter of the open area may be smaller than a diameter of the ball-shaped ground unit 135. Therefore, it is possible to inhibit or prevent the ground unit 135 from departing outward from the grounding housing 110. In addition, since the ground unit 135 has a ball shape, the possibility that the ground unit 135 is damaged due to friction with the rotation shaft 200 may be reduced. In addition, since the ground unit 135 has a ball shape, the ground portion 135 and the rotation shaft 200 may be in point contact each other. For example, according to one form of FIG. 5, an area where the ground unit 135 and the rotation shaft 200 contact each other may be reduced compared to the forms of FIGS. 3 and 4. The ground unit 135 may be electrically connected to the ground plate 170, and the ground plate 170 may be connected to the spring 150. The ground unit 135, the spring 150, and the ground plate 170 may be disposed inside the ground housing 110, and only a portion of the ground unit 135 may be exposed outside the ground housing 110.

Figure 6:
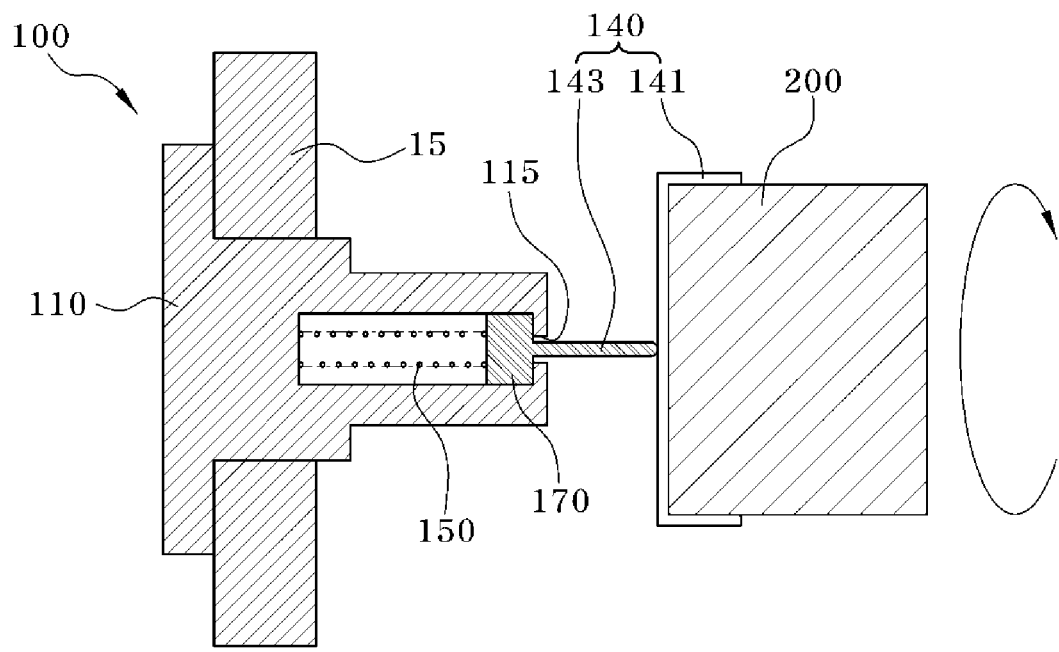
FIG. 6 is a view illustrating a ground structure of a driving motor grounding a rotation shaft in one form of the present disclosure.

FIG. 6 is a view illustrating a ground structure of a driving motor according to one form of the present disclosure grounding a rotation shaft.

With reference to FIG. 6, a ground structure 100 may include a ground unit 140 that includes a ground cover 141 covering an end of a rotation shaft 200 and an extension portion 143 extending from the ground cover 141 toward a ground housing 110. The ground cover 141 may cover the end of the cylindrical rotation shaft 200. The extension portion 143 may be connected to the ground cover 141, and the extension portion 143 may be disposed at a position coinciding with the rotation axis and extended in a direction coinciding with the rotation axis. The extension 143 may be rotated at the same rotational speed as the rotation shaft 200.

The extension portion 143 may contact a ground plate 170. A sectional area, in a direction perpendicular to the rotation axis, of the extension portion 143 may be smaller than a sectional area of the ground plate 170. Accordingly, a friction area that causes friction with the ground plate 170 may be determined according to an extent of the sectional area of the extension portion 143. The slip phenomenon may occur between the extension portion 143 and the ground plate 170, and thus the rotational force of the extension portion 143 transmitted to the spring 150 may be reduced. Accordingly, it is possible to prevent the spring 150 from being damaged due to the rotational force of the rotation shaft 200.

Figure 7:
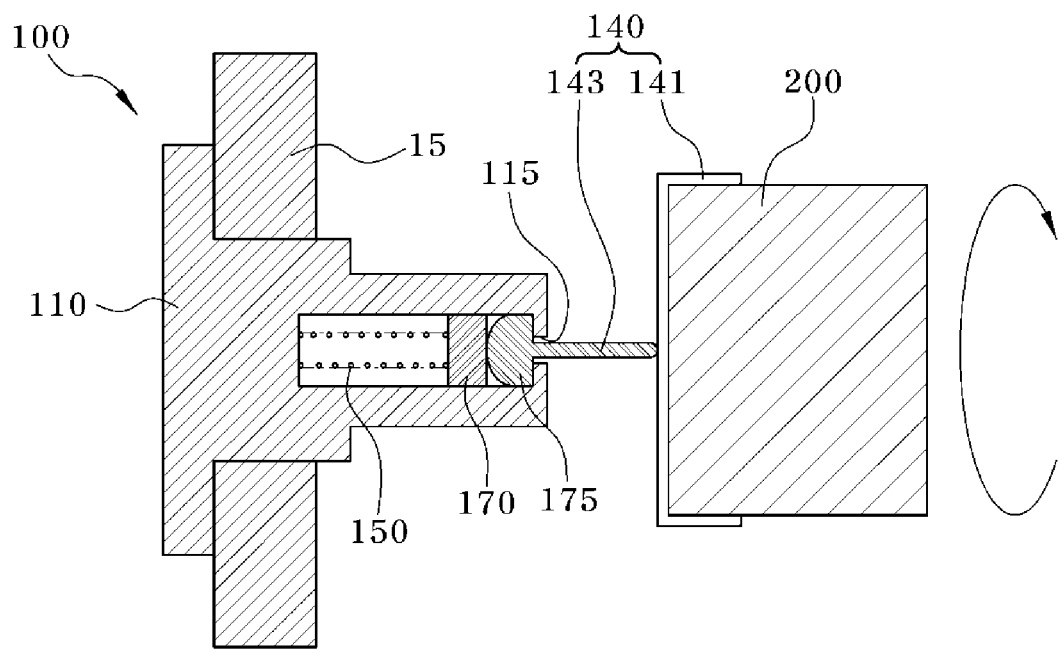
FIG. 7 is a view illustrating a ground structure of a driving motor grounding a rotation shaft in one form of the present disclosure.

FIG. 7 is a view illustrating a ground structure of a driving motor according to one form of the present disclosure grounding a rotation shaft. For the sake of simplicity, a description of contents overlapping with FIG. 6 is omitted.

With reference to FIG. 7, a ground structure 100 may include a ground unit 140 that includes a ground cover 141 and an extension portion 143, a spring 150 fixedly coupled to a ground housing 110, a ground plate 170 in contact with the spring 150, and an additional ground plate 175 disposed between the ground plate 170 and the ground unit 140. The additional ground plate 175 may be provided to prevent the spring 150 from being damaged due to the rotational force generated by the rotation shaft 200. Compared to FIG. 6, as the two ground plates 170 and 175 are provided between the ground unit 140 and the spring 150, the rotational force of the rotation shaft 200 may be reduced or minimized to be transmitted to the spring 150. Accordingly, a possibility of damage to the spring 150 may be lowered, whereby durability of the ground structure 100 may be improved.

The forms of the present disclosure have been described above with reference to the accompanying drawings, but those skilled in the art to which the present disclosure pertains may understand that the present disclosure may be implemented in other specific forms without changing the technical spirit or essential features thereof. Accordingly, it should be understood that the forms described above are illustrative and not restrictive in all respects.

What is claimed is:

1. A ground structure of a driving motor applied to an eco-friendly vehicle, the ground structure comprising:
   a rotation shaft rotatably supported by a bearing;
   a motor housing enveloping the bearing and the rotation shaft;
   a ground structure disposed in a direction in which the rotation shaft extends; and
   a cover having the ground structure installed therein and connected to the motor housing,
   wherein the ground structure is configured to contact the rotation shaft through a ground unit, thereby grounding the rotation shaft, wherein the ground structure further comprises:
   a ground housing connected to the cover, wherein the ground unit is extended from an inside of the ground housing and configured to contact the rotation shaft; and
   a spring fixedly coupled inside the ground housing and electrically connected to the ground unit, and
wherein:
   the ground structure further comprises a ground plate disposed between the ground unit and the spring,
   the ground unit is configured to rotate according to a rotation of the rotation shaft, and
   the ground plate is configured to contact the ground unit and prevent the spring from being damaged due to the rotation of the ground unit.

2. The ground structure of claim 1, wherein the ground plate is configured to reduce rotational force transmitted to the spring due to slip of a rotation body of the ground unit.

3. The ground structure of claim 1, wherein the ground unit comprises:
   an extension portion extending toward the rotation shaft in the ground housing so as to contact the rotation shaft; and
   a support portion configured to inhibit the ground unit from departing outward from the ground housing and contact the ground plate.

4. The ground structure of claim 3, wherein:
   the ground housing has an opening in which one end of the ground housing is open in a direction toward the rotation shaft, and
   the support portion has a sectional area larger than an open area of the opening to prevent the ground unit from departing outward from the ground housing.

5. The ground structure of claim 3, wherein:
   the support portion is divided into a first region adjacent to the extension portion and a second region adjacent to the ground plate, and
   the second region includes a sectional area which decreases in a direction toward the ground plate.

6. The ground structure of claim 1, wherein:
   the ground housing has an opening in which one end of the ground housing is open in a direction toward the rotation shaft, and
   the ground unit is configured as a ball having a diameter larger than a diameter of an open area of the opening.

7. The ground structure of claim 1, wherein a sectional area of the ground unit is smaller than a sectional area of the rotation shaft.

8. The ground structure of claim 1, wherein the ground unit is configured to contact a center of the rotation shaft.

9. A ground structure of a driving motor applied to an eco-friendly vehicle, the ground structure comprising:
   a rotation shaft rotatably supported by a bearing;
   a motor housing enveloping the bearing and the rotation shaft;
   a ground structure disposed in a direction in which the rotation shaft extends;
   a cover having the ground structure installed therein and connected to the motor housing,
   wherein the ground structure is configured to contact the rotation shaft through a ground unit, thereby grounding the rotation shaft;
   a ground housing connected to the cover, wherein the ground unit is configured to contact the rotation shaft and extend into the ground housing;
   a ground plate electrically connected to the ground unit; and
   a spring fixedly coupled inside the ground housing and connected to the ground plate,
   wherein the ground unit comprises a ground cover covering an end of the rotation shaft and an extension portion extending from the ground cover toward the ground housing.

10. The ground structure of claim 9, wherein the ground structure further comprises an additional ground plate provided between the ground unit and the ground plate to prevent the spring from being damaged due to rotation of the rotation shaft.

11. A ground structure of a driving motor applied to an eco-friendly vehicle, the ground structure comprising:
   a rotation shaft rotatably supported by a bearing;
   a motor housing enveloping the bearing and the rotation shaft;
   a ground structure disposed in a direction in which the rotation shaft extends; and
   a cover having the ground structure installed therein and connected to the motor housing,
   wherein the ground structure is configured to contact the rotation shaft through a ground unit, thereby grounding the rotation shaft,
   wherein:
   the ground structure is disposed to penetrate through the cover,
   the ground unit is disposed inside the motor housing, and
   one end of the ground structure disposed in a direction opposite to the ground unit is disposed outside the motor housing.

* * * * *